L. BARTLETT.
REAR AUTOMOBILE SIGNAL.
APPLICATION FILED APR. 20, 1920.
1,402,828. Patented Jan. 10, 1922.
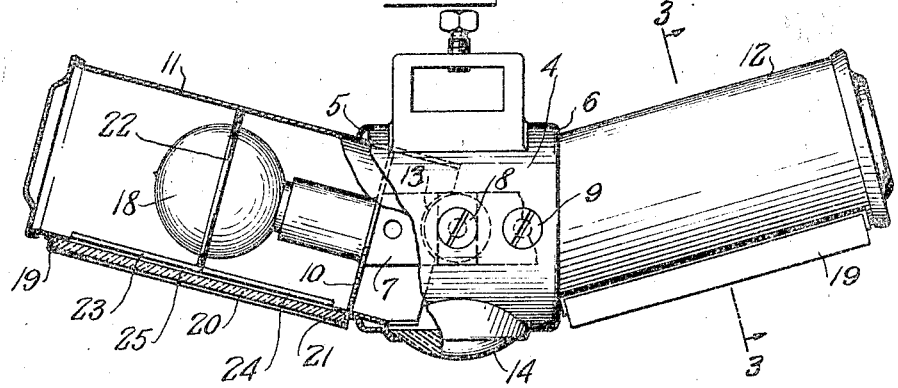
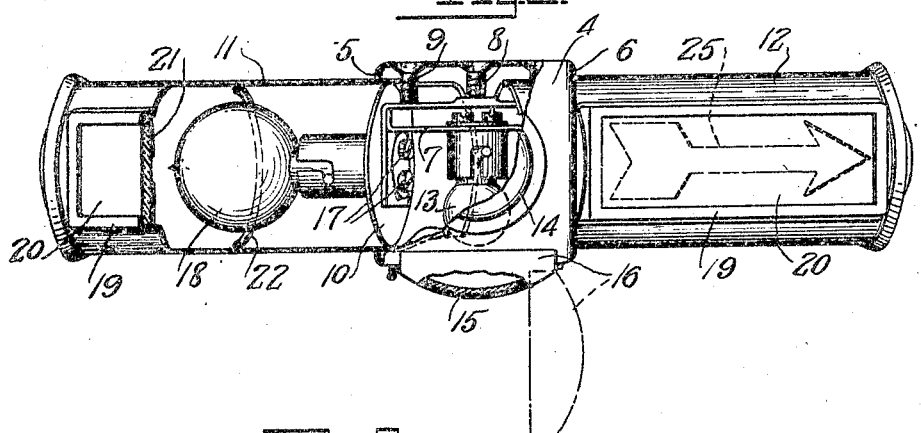
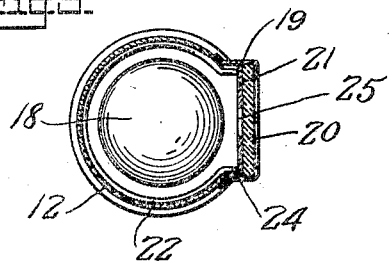
Inventor
Leonard Bartlett
By his Attorney

UNITED STATES PATENT OFFICE.

LEONARD BARTLETT, OF BOSTON, MASSACHUSETTS, ASSIGNOR TO RELIANCE MACHINE & SPECIALTY CO., OF BOSTON, MASSACHUSETTS, A CORPORATION OF MASSACHUSETTS.

REAR AUTOMOBILE SIGNAL.

1,402,828.　　　　Specification of Letters Patent.　　Patented Jan. 10, 1922.

Application filed April 20, 1920. Serial No. 375,413.

*To all whom it may concern:*

Be it known that I, LEONARD BARTLETT, a citizen of the United States, residing at Boston, in the county of Suffolk and State of Massachusetts, have invented a new and useful Rear Automobile Signal, of which the following is a specification.

This invention relates to automobile signals, and has for its object to provide a signal device which can be mounted on the rear of an automobile in the manner to indicate to any observer the movement of an automobile.

The invention is illustrated in the accompanying drawing in which—

Fig. 1, is a plan view, partly in section, of a rear automobile signal constructed in accordance with my invention;

Fig. 2, is an elevation thereof, partly in section; and,

Fig. 3, is a sectional view, on the line 3—3 of Fig. 1.

In the drawing, like numerals of reference refer to the same parts in each of the views.

In practice I provide a central casing 4, provided with inturned ends 5 and 6, and having mounted therein a frame 7, provided with screw holes whereby a central screw 8 may be used to hold the frame within the casing, and two end screws 9 may be used in connection with discs 10 to clamp the end casings 11 and 12 in position—the inturned ends 5 and 6 being used in this connection, as will be readily understood.

The central casing has mounted therein an electric bulb 13, visible through a glass 14, which is preferably red, and through a glass 15 in the bottom of the casing, which is preferably white. The glass 15 may be mounted in a door 16, which may be swung down, as shown in dotted lines in Figure 2, to give ready access to the bulb 13, and to the electrical connections 17, of the electric bulbs 18 mounted in each of the end casings, and wired to give the signals desired.

Each of the end casings is substantially round in cross-section; and each is provided with an angled, perforated portion 19, in the front thereof in which is mounted in a visible manner a glass 20 on which the signal may be defined by a perforated mask 21, held in place with a spring clamp 22 having angled ends 23 and 24, which are oppositely disposed, as clearly shown in Figure 1.

As shown in the drawing, the mask 21 is perforated to define an arrow 25 on the glass 20; but it is evident any indicating device could be produced that might be stamped in the mask.

In operation, the bulb 13 is supposed to be lighted at all times when the automobile is in operation at night; and furnishes the "tail light" and the illumination for the license tag. The bulbs 18 are illuminated only when it is desired to turn to the right, or to the left. If both are illuminated at once it is an indication that the automobile is about to stop.

It is desirable that the glasses 20 be of ground, red glass as the arrow would be so sharply defined on the same in connection with the mask as to be plainly visible in daylight. Thus the signal would be available for use both in the day time and at night.

It will thus be seen that I have provided a rear signal that is easy to construct, easy to assemble, and efficient in use.

The drawings show that the end casings have cut out portions so the same can be readily passed within the central casing; and will not interfere with the radiation of the light when in use.

I claim:

1. A rear signal for automobiles comprising a central casing provided with means for access to the interior thereof, a tail light mounted in said central casing, two end casings in said central casing, and clamping means securing said casings in place, each of said end casings projecting within said central casing, and having cut-out portions adapted to coact with the clamping means, and each having a signal device mounted therein, for the purpose set forth.

2. The herein described rear automobile signal comprising a central casing with inturned ends, a frame mounted in said casing and provided with discs at each end thereof and with an electric bulb centrally thereof forming a tail light, said casing being provided with two ports closed with glasses, and end cases mounted in the opposite ends of said central casing and clamped therein in connection with said discs and inturned ends, each of said end casings having a cut-out portion, and carrying an electric bulb, a glass, a perforated mask, and a spring clamp, for the purpose set forth.

Dated April 16th, 1920.

LEONARD BARTLETT.